United States Patent [19]
Dell'Amico et al.

[11] 3,929,973
[45] Dec. 30, 1975

[54] PROCESS FOR THE PREPARATION OF CARBONYL DERIVATIVES

[75] Inventors: Daniela Belli Dell'Amico, Carrara; Fausto Calderazzo, Ghezzano, both of Italy

[73] Assignee: Snamprogetti S.p.A., San Donato Milanese, Italy

[22] Filed: Mar. 4, 1974

[21] Appl. No.: 447,739

[30] Foreign Application Priority Data
Feb. 5, 1973 Italy................................. 20007/73

[52] U.S. Cl............................. 423/417; 260/544 K
[51] Int. Cl.²........................................... C01G 1/04
[58] Field of Search ........................... 423/416–418; 260/544 K

[56] References Cited
OTHER PUBLICATIONS

Kharasch et al., "The Chemistry of Organic Gold Compounds, I. Aurous Chloride Carbonyl & A Method of Linking Carbon to Carbon," J.A.C.S. Vol. 52, July 1930, pp. 2919–2927.

Primary Examiner—Earl C. Thomas
Attorney, Agent, or Firm—Ralph M. Watson, Esq.

[57] ABSTRACT

Gold-carbonyl chloride and phosgene are prepared by reacting gold trichloride with carbon monoxide through a process wherein carbon monoxide is bubbled through a solution of gold trichloride in thionyl chloride at room temperature and atmospheric pressure.

2 Claims, No Drawings

PROCESS FOR THE PREPARATION OF CARBONYL DERIVATIVES

The present invention relates to a process for the preparation of carbonyl derivatives, particularly gold-carbonyl chloride and phosgene, which are obtained according to only one reaction which may easily and cheaply performed.

The importance of those two compounds is known. For instance gold-carbonyl chloride is employed as a catalyst in the synthesis of carbonic acid esters as described in Italian Pat. No. 898,077 owned by the assignee of this application, while phosgene may be widely employed in industry, for instance as a chlorinating agent, in the synthesis of dyes, organic compounds such as, particularly, isocyanates, polyurethane and polycarbonate resins.

Methods for the preparation of gold-carbonyl chloride and phosgene are also known.

For instance the former is prepared by starting with anhydrous gold trichloride, which is reacted with carbon monoxide both in the solid phase and in the presence of solvents. However the yields are very low and the reactions occur at high temperatures.

As to phosgene, it is generally prepared by means of a direct synthesis between carbon monoxide and chlorine through a very exothermic reaction, which requires strict precautions that often do not make it possible to obtain satisfactory results and which always constitute a continuous economic burden. It has now been found, which is the subject of the present invention, that it is possible to turn quantitatively gold trichloride into gold-carbonyl chloride and phosgene at atmospheric pressure and room temperature by letting carbon monoxide be absorbed in presence of thionyl chloride as a solvent. The reaction may be schematized as follows:

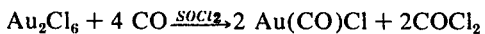

$$Au_2Cl_6 + 4\ CO \xrightarrow{SOCl_2} 2\ Au(CO)Cl + 2COCl_2$$

When only phosgene must be produced, the aforesaid reaction may be always employed, and it even becomes a catalytic one since gold-carbonyl chloride, through a simple reaction with chlorine, gives rise to starting gold trichloride, which again absorbs carbon monoxide and so on.

Furthermore, since it is known from our copending application Ser. No. 447,644, filed Mar. 4, 1974 that it is possible to prepare anhydrous gold trichloride by reacting hydrated tetrachloroauric acid with thionyl chloride, it is possible to carry out the inventive reaction without separating the intermediate product, i.e., gold trichloride. It is sufficient to send a carbon monoxide stream into the reaction vessel employed for preparing trichloride. It is also possible to carry out the reaction between tetrachloroauric acid and thyonil chloride in the presence of carbon monoxide.

Gold-carbonyl chloride and phosgene are quantitatively separated at the end of the reactions.

The invention will be more completely understood by examining the following illustrative example.

EXAMPLE 5 g of tetrachloroauric acid (12.70 mmoles) were added to 30 ml of thionyl chloride (0.41 mmole) and stirred. After about 12 hours a carbon monoxide stream was bubbled into the reaction vessel. After 15 hours the gold trichloride suspension had completely disappeared and the reaction mixture consisted of uncoloured crystals in a lightly yellow solution.

Some anhydrous heptane was added and the uncoloured solid was filtered under a stream of carbon monoxide and shortly afterwards dried (~15 minutes) under vacuum (2.6 g at a 78.6% yield).

The analysis as to Au(CO)Cl gave the following results:

|  | C | H | Cl | CO | Au |
|---|---|---|---|---|---|
| found | 4.85 | 0.00 | 13.74 | 10.02 | 76.34 |
| calculated | 4.61 | 0.00 | 13.61 | 10.75 | 75.63 |

The compound was identified by its properties, which corresponded to those mentioned in the scientific papers.

Gold-carbonyl chloride showed an infrared absorption due to the stretching vibration of the C — O group at the following wave lengths: 2162 cm$^{-1}$ (SOCl$_2$), 215 cm$^{-1}$ (CCl$_4$) and 2158 cm$^{-1}$ (tetrahydrofuran): a light solvent effect was noted.

The CO volume absorbed by Au$_2$Cl$_6$ (0.328 g corresponding to 1.08 mmoles of gold) in thionyl chloride (20 ml) was measured at 17°C. The reaction mixture was kept under stirring over 24 hours. The absorbed gas corresponded to 1.81 mmoles, equal to a CO: Au ratio of 1.7, reasonably agreeing with the theoretical value 2 deduced from the abovesaid reaction scheme.

The lower value is due to phosgene present in the gaseous phase.

The presence of phosgene in the liquid phase was determined spectroscopically, because of the very strong band present at 1800 cm$^{-1}$.

What we claim is:

1. Process for the preparation of gold-carbonyl chloride and phosgene by reacting gold trichloride with carbon monoxide which consists in bubbling carbon monoxide through a solution of gold trichloride in thionyl chloride at room temperature and atmospheric pressure.

2. Process for the preparation of gold-carbonyl chloride and phosgene as claimed in claim 1, wherein said solution of gold trichloride in thionyl chloride is constituted by the reaction mixture obtained through the process of preparing gold trichloride by reacting hydrated tetrachloroauric acid with thionyl chloride.

* * * * *